United States Patent
Bowler

(10) Patent No.: US 10,042,780 B2
(45) Date of Patent: Aug. 7, 2018

(54) INTEGRITY PROTECTION FOR DATA STORAGE

(71) Applicant: Synopsys Inc., Mountain View, CA (US)

(72) Inventor: Michael Kenneth Bowler, Ottawa (CA)

(73) Assignee: Synopsys, Inc., Mountain View, CA (US)

(*) Notice: Subject to any disclaimer, the term of this patent is extended or adjusted under 35 U.S.C. 154(b) by 265 days.

(21) Appl. No.: 15/161,021

(22) Filed: May 20, 2016

(65) Prior Publication Data

US 2016/0267024 A1    Sep. 15, 2016

Related U.S. Application Data

(63) Continuation-in-part of application No. 14/535,999, filed on Nov. 7, 2014, now Pat. No. 9,350,732.

(51) Int. Cl.
   *G06F 11/30* (2006.01)
   *G06F 12/14* (2006.01)
   (Continued)

(52) U.S. Cl.
   CPC ........ *G06F 12/1408* (2013.01); *G06F 3/0619* (2013.01); *G06F 3/0623* (2013.01);
   (Continued)

(58) Field of Classification Search
   CPC ..... G06F 12/1408; G06F 3/0619; G06F 21/64
   (Continued)

(56) References Cited

U.S. PATENT DOCUMENTS

| | | | |
|---|---|---|---|
| 7,681,050 B2* | 3/2010 | Blom | G06F 21/64 713/161 |
| 8,015,378 B2* | 9/2011 | Gehrmann | G06F 21/572 711/163 |
| 8,595,490 B2* | 11/2013 | von Mueller | G06Q 20/085 705/35 |
| 9,350,732 B1* | 5/2016 | Bowler | H04L 63/0876 |

(Continued)

FOREIGN PATENT DOCUMENTS

WO    2016/071743    5/2016

OTHER PUBLICATIONS

Savin, Daniela, International Search Report received from the Canadian Intellectual Property Office dated Jul. 16, 2015 for appln. No. PCT/IB2014/065885, 3 pgs.

(Continued)

*Primary Examiner* — Dant B Shaifer Harriman
(74) *Attorney, Agent, or Firm* — Jaquez Land Greenhaus LLP; Bruce W. Greenhaus, Esq.

(57) ABSTRACT

A method and system for protecting the integrity of a memory system. An age counter and an opportunity counter are provided for each of multiple memory blocks. An epoch counter is provided for the memory system. Data is written in a selected memory block which increases the local sequence number of the selected memory block. The opportunity counter for the selected memory block is updated if the local sequence number of the selected memory block rolls over. A message authentication code (MAC) is generated in the selected memory block based on a global sequence number and the local sequence number. The age counter and the opportunity counter are updated for memory blocks when the opportunity counter for the memory blocks matches the LSB of the epoch counter. A new MAC is generator for any memory block for which the updating is performed.

6 Claims, 3 Drawing Sheets

(51) Int. Cl.
    *G06F 3/06*           (2006.01)
    *H04L 9/32*           (2006.01)
    *G06F 21/78*         (2013.01)
    *G06F 21/64*         (2013.01)
    *H04L 29/06*        (2006.01)

(52) U.S. Cl.
    CPC .......... *G06F 3/0661* (2013.01); *G06F 3/0673* (2013.01); *G06F 21/64* (2013.01); *G06F 21/78* (2013.01); *H04L 9/3242* (2013.01); *H04L 63/0876* (2013.01)

(58) Field of Classification Search
    USPC ....................................................... 713/193
    See application file for complete search history.

(56) References Cited

U.S. PATENT DOCUMENTS

| | | | | |
|---|---|---|---|---|
| 2009/0100272 A1* | 4/2009 | Smeets | ................ | G06F 21/121 |
| | | | | 713/189 |
| 2012/0317344 A1* | 12/2012 | Sibert | .................. | G06F 21/572 |
| | | | | 711/103 |
| 2014/0208109 A1* | 7/2014 | Narendra Trivedi | . | H04L 9/0643 |
| | | | | 713/170 |

OTHER PUBLICATIONS

Savin, Daniela, Written Opinion of the International Searching Authority received from the Canadian Intellectual Property Office dated Jul. 16, 2015 for appln. No. PCT/IB2014/065885, 4 pgs.

* cited by examiner

INTEGRITY PROTECTION FOR DATA STORAGE

CROSS REFERENCE TO RELATED APPLICATIONS—CLAIM OF PRIORITY

This application is a continuation-in-part of co-pending application Ser. No. 14/535,999 filed Nov. 7, 2014, entitled "Integrity Protection for Data Storage", the disclosure of which is incorporated herein by reference in its entirety.

TECHNICAL FIELD

The present disclosure relates to integrity protection of data storage, memory caching and cryptography.

SUMMARY

In accordance with one embodiment, a system and a method are provided for protecting the integrity of a memory system divided in a plurality of memory blocks each of which has a local sequence number. The method: (1) maintains a sequence number that is associated with each of the plurality of memory blocks, the sequence number comprising an age counter and an opportunity counter; (2) maintains a global epoch counter for the memory system; (3) stores new data in the selected memory block; (4) if the value of the opportunity counter is not equal to the value of the LSB (least significant bit) of the global epoch counter, then sets the value of the opportunity counter to the value of the LSB of the global epoch counter, resets the age counter to zero and updates the Message Authentication Code (MAC) associated with the memory block using a portion of the global epoch and the local sequence number; (5) if the value of the opportunity counter is equal to the value of the LSB, then increments the age counter associated with the selected memory block; (6) updates the opportunity counter and resets the age counter for the selected memory block and recalculates the MAC for the selected memory block if the age counter associated with the selected memory block rolls over; (7) updates the age counter and the opportunity counter for any non-selected memory blocks if the opportunity counter for the non-selected memory blocks matches the LSB of the global epoch counter for the non-selected memory blocks; and (9) computes a new MAC for any memory block for which the updating is performed.

In one implementation, each of the MACs is updated opportunistically (1) after the corresponding age counter rolls over and (2) during the writing of data to the corresponding memory block.

The system for protecting the integrity of data stored in blocks of memory comprises a global epoch counter comprising a field of most significant bits (MSBs) and a field of least significant bits (LSBs). The system further comprises a plurality of registers for maintaining memory blocks. At least one local sequence number register is provided in association with each of the memory block registers. In addition, in some embodiments, at least one MAC register is provided in association with each block of memory.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

Figure 1:
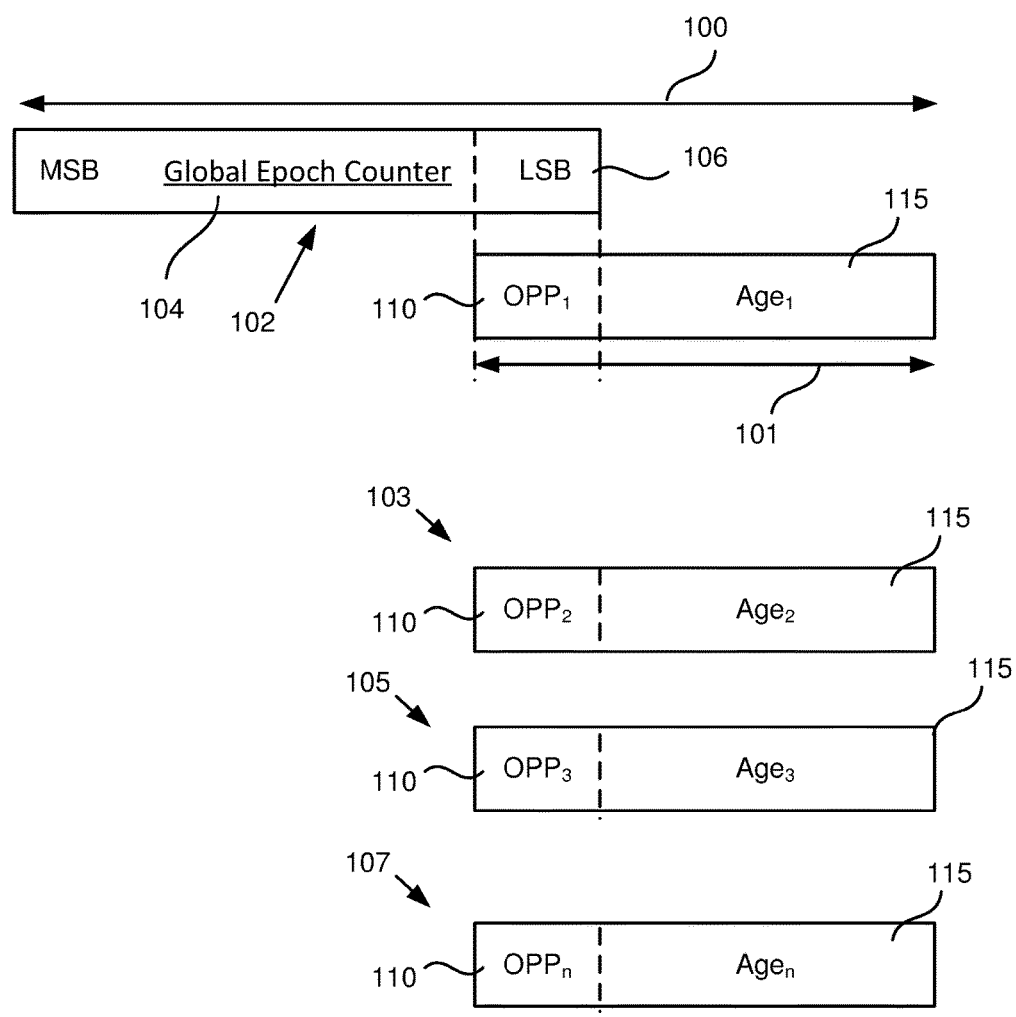
FIG. 1 is a diagram of a global sequence number register and a plurality of local sequence number registers.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Integrity protection of memory systems located on insecure devices is generally performed by computing a cryptographic integrity protection value or Message Authentication Code (MAC) and storing it along with (i.e., in association with) the data. This provides protection against an unauthorized third party modifying the information written in memory. That is, by storing a MAC in association with the content used to generate the MAC, a copy of the MAC can be generated by applying the same scheme used to generate the original MAC to the content to be verified. If the value generated differs from the stored MAC, then the original content was altered after generation of the stored MAC.

A MAC algorithm, sometimes called a keyed (cryptographic) hash function accepts as input a secret key and arbitrary-length data to be authenticated, and outputs a MAC (sometimes known as a tag). It should be understood by those skilled in the art that a cryptographic hash function is only one of the possible ways to generate MACs. The MAC value protects the data integrity as well as its authenticity, by allowing verifiers who also possess the secret key to detect any changes to the data content.

When the memory is authentically updated, the MAC is recomputed. To prevent replays of previously authentic values (i.e., attacks in which a previously authenticated value is used to gain unauthorized access to the memory), a unique value, such as a counter or a sequence number, is added to the authentication input.

A MAC is also used when data is read from a cache to external memory. In this case, to prevent an attacker from replaying previous segments of data, a sequence number is associated with each cache line in the memory. Therefore, an attacker cannot capture an image of the external memory and after the memory has been updated, replace the cache lines within the memory with a previously captured version.

Generally, to avoid long delays when writing new data to memory, the memory is segmented into memory blocks, and a MAC is stored along with each memory block. A block can be one cache line or a larger memory space. Therefore, the authentication algorithm only needs to be performed over an individual, smaller memory block. However, a separate sequence number needs to be maintained for every memory block. The sequence number needs to be sufficiently large to prevent it from expiring (rolling over) too often. When a sequence number expires, the cryptographic integrity algorithm needs to be re-keyed, which results in recomputing the MAC for all data blocks. During the refresh process, the memory system is not accessible, leading to access delays. Large sequence numbers are therefore preferable. However, using a large sequence number associated with each of a large number of data blocks requires a substantial amount of data to be stored and maintained.

An existing solution is to maintain a small local sequence number per memory block and an epoch counter. The epoch counter and the local sequence number are concatenated to form the sequence number applied to the integrity algorithm. However, any time one of the relatively small local sequence numbers expires (i.e., rolls over), the epoch counter is incremented. When this occurs, each MAC needs to be updated. Unfortunately, the memory system is not accessible during such update processes.

Therefore, it is desirable to reduce the storage requirements (i.e., the amount of memory required) to maintain the sequence numbers while minimizing the number of refresh events required and the frequency and duration of access delays. It is also desirable to update a MAC opportunistically during normal data updates or in the background such that the memory remains accessible while the epoch counter is being updated.

FIG. 1 shows counters and registers used to maintain and generate a global sequence number 100 in accordance with some embodiments of the disclosed method and apparatus. The global sequence number 100 is used to generate a cryptographic integrity protection code, such as a Message Authentication Code (MAC) to verify data written to and read from memory blocks. The protection code is stored in a protection code register 205. In the case in which the protection code is a MAC, it is stored in a MAC register 205. In some embodiments, the MAC is stored in the memory block 201 itself. The global sequence number 100 is generated from the value of one of a plurality of local sequence number registers 101, 103, 105, 107 and the value represented by the most significant bits (MSBs) 104 of a global epoch counter 102. That is, the global epoch counter 102 has two fields. The first field is the MSBs 104. The second field is the LSBs (least significant bits) 106, shown separated by a dashed line in FIG. 1. In addition, each of the local sequence number registers 101, 103, 105, 107 comprises two counters. The first is an opportunity counter 110. The second is an age counter 115.

Figure 2:
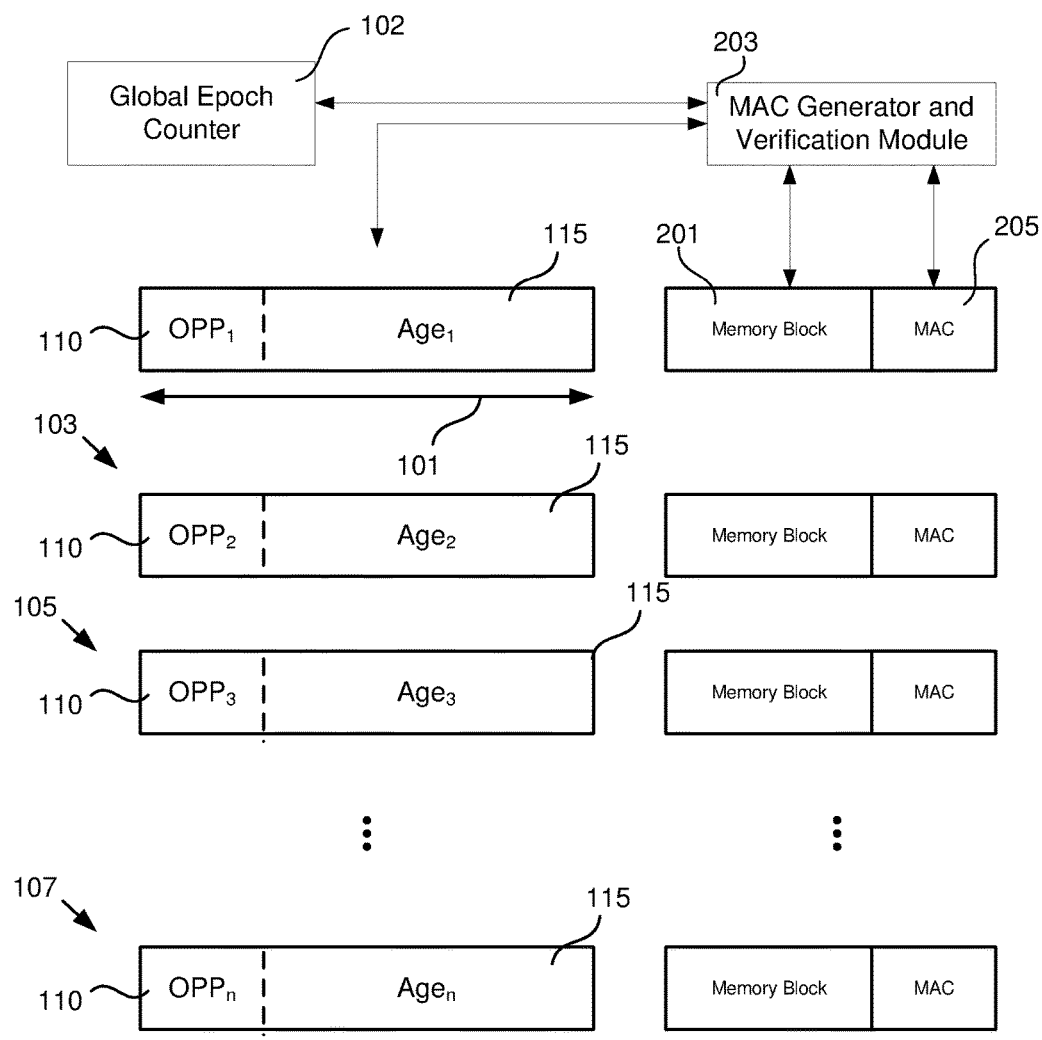
FIG. 2 is a diagram showing memory blocks associated with local sequence number registers and Message Authentication Code (MAC) registers.

The local sequence number registers 101, 103, 105, 107 are each associated with one of a plurality of external cache line registers or memory blocks. FIG. 2 shows a plurality of memory blocks 201, there being a one to one correspondence such that for each memory block there is one associated opportunity counter 110 and one associated age counter 115. Accordingly, each memory block is associated with one of the local sequence number registers 101, 103, 105, 107. The global epoch counter 102 is global to all of the local sequence numbers and associated memory blocks 201.

The width of the age counter 115, opportunity counter 110, and global epoch counter 102 can be tuned to trade-off the frequency of epoch update, off-line integrity check refresh to new epoch values, and opportunistic epoch updates versus memory storage requirements for the counter values. As an example, a 32-bit global sequence number 100 can include a 4-bit age counter 115 and a 2-bit opportunity counter 110.

The MSBs 104 of the global epoch counter 102, the value of the opportunity counter 110 and the value of the age counter 115 are concatenated to form the full sequence number used in computing the MAC that provides integrity protection. The LSBs 106 of the epoch counter 102 are "inferred" by the local opportunity counter 110. That is, when combining the MSBs 104 of the global epoch counter 102 with the local sequence number 101, 103, 105, 107 to form the global sequence number 100 used to generate a MAC value, the value of the opportunity counter 110 of the particular local sequence number 101, 103, 105, 107 is substituted for the value of the LSBs 106 of the epoch counter 102.

The refresh process of an external cache line MAC value is performed by reading in the contents of the memory block 201 and validating the MAC associated with those contents. A new MAC is computed using the updated global sequence number 100.

As the epoch counter 104 exceeds predetermined thresholds, interrupts are optionally generated to a MAC Generator and Verification Module (MGVM) 203 at various thresholds to prompt a proactive rekey operation before the counter expiration. The MGVM 203 is a processor that is capable of, and responsible for, performing the processing functions necessary to perform data integrity operations, such as authentication, including generating MACs, etc.

Optionally, a background process checks the opportunity counters 110 and updates the MAC generated from any opportunity counter 110 that is about to expire (for example the memory blocks that are 1 bit away from the LSB 106 of the epoch 102). The background process may be performed by the MGVM 203 or another processor tasked with such functions. During the background process any memory block MAC can be updated based on a pre-determined policy. This maximizes the time a cache-line can be opportunistically updated before getting hit with a refresh, and still allows the refresh to run as a background process.

Figure 3:
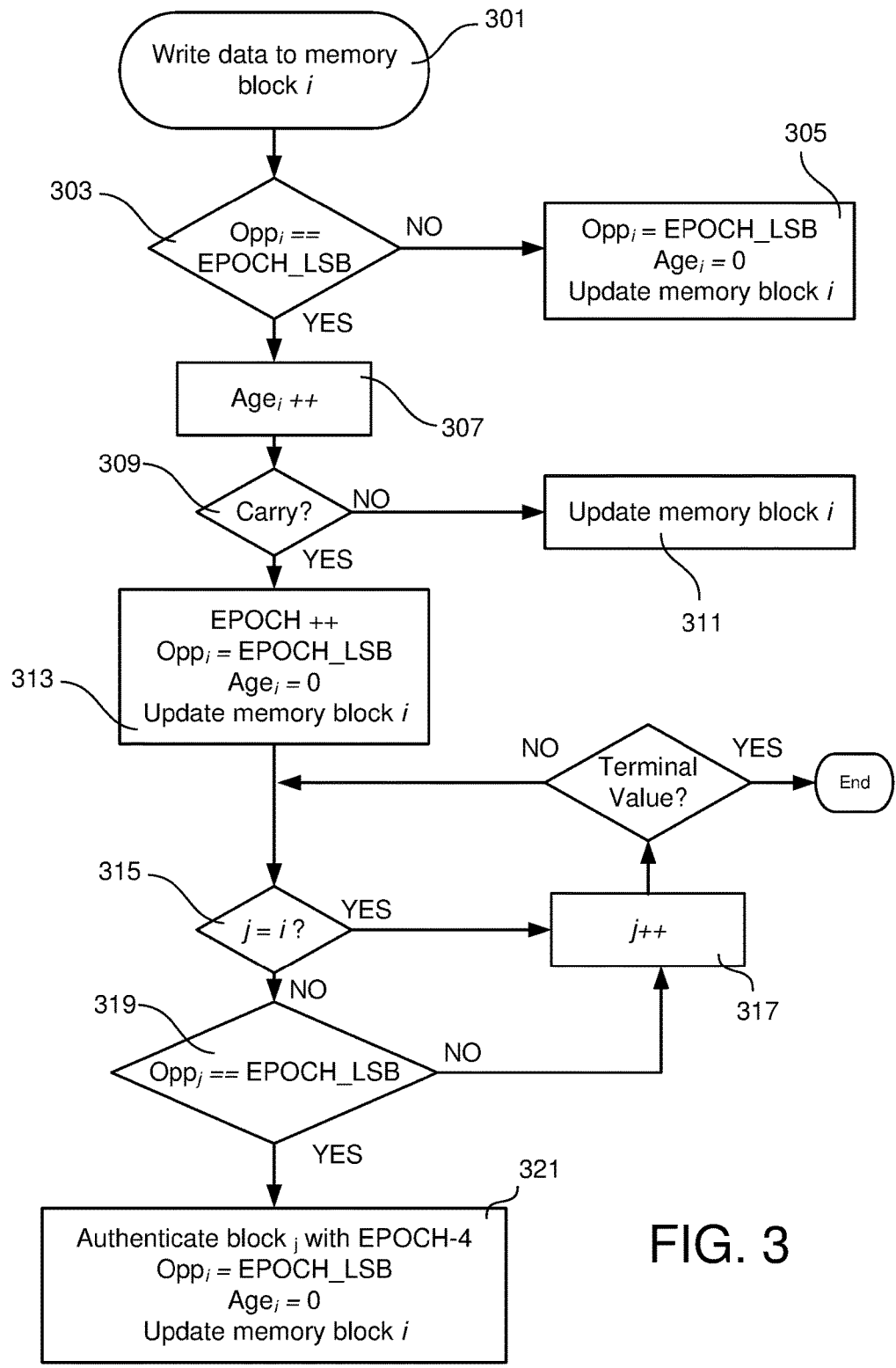
FIG. 3 is a flow chart of an example of the use of a local sequence number with an opportunity counter.

FIG. 3 shows a flow chart of one embodiment of the method. Before beginning the process, all of the local sequence number registers 101, 103, 105, 107 are reset to zero by the MGVM 203 upon key initialization. In one embodiment, the MGVM 203 is capable of, and responsible for, performing the processing functions necessary to perform the process shown in FIG. 3. Alternatively, the functions may be performed by two or more processors working either independently or in a coordinated fashion.

In the method shown in FIG. 3, data is written to a memory block i in step 301. Every time a cache line is written to external memory, the opportunity counter 110 associated with that cache line is compared to the LSBs 106 of the global epoch counter 102. In step 303, the method determines whether the opportunity counter 110 associated with the memory block i is equal to the value of the LSB 106 of the global epoch counter 102. If step 303 determines that the opportunity counter 110 for block i is different from the LSB 106 of the global epoch counter 102, then the value of the local sequence number is from a different epoch than that of the global epoch counter 102. That is, the value of the global epoch counter 102 was changed as a consequence of data having been written to another memory block. Accordingly, in step 305, the method sets the value of the opportunity counter 110 for memory block i equal to the value of the LSB 106 of the epoch counter 102. In addition, the method resets the age counter 115 associated with memory block i to zero.

A new MAC is then determined and associated with the data written to the memory block (i.e., the memory block i is updated). The value used to determine the new MAC is the MSB 104 of the global epoch 102 concatenated with the entire sequence number (i.e., the value of the opportunity counter 110 and the value of the age counter 115) associated with the memory block i.

However, if in step 303 it is determined that the value of the opportunity counter 110 is equal to the LSB 106 of the global epoch counter 102 (i.e., the local sequence number is in the current epoch), then the age counter 115 for block i is incremented in step 307. It should be noted that the values of the age counters 115 in each of the other local sequence number registers are not incremented. If it is determined in step 309 that the age counter 115 did not roll (i.e., there is no carry as a consequence of the incrementing of the age counter), then the memory block i is updated (i.e., a new MAC is determined using the MSBs 104 of the global epoch counter 102, concatenated with the value of the opportunity counter 110 associated with memory block i and the new value of the age counter 115) in step 311.

If, however, it is determined in step 309 that the age counter 115 did roll over (i.e. incremented from all ones to all zeros), then the epoch counter 102 is incremented in step 313 to track the impact of the carry on the opportunity counter 110 associated with that memory block i. In addition, the opportunity counter 110 associated with memory block i is set to the LSB 106 of the epoch counter 102 and the age counter 115 is reset to 0. The memory block i is updated by determining a new MAC value from the upper portion 104 of the global epoch counter 102 concatenated with the local sequence number associated with the memory block i.

After incrementing the global epoch counter 102, it is necessary to check the values of the opportunity counters 110 in all of other the local sequence numbers 101, 103, 105, 107 (i.e., the local sequence numbers associated with the memory blocks other than memory block i). This is because it is possible for data to have been written to one of the memory blocks several times before data is written to all of the other memory blocks. If that happens, the LSB 106 of the global epoch counter can roll over to a value contained in one of the opportunity counters 110 of a memory block other than memory block i. Accordingly, the upper portion 104 of the global epoch counter 102 will increment, while the LSB 106 is returned to the value equal to the value of an opportunity counter 110 associated with one of the memory blocks to which data had not been recently written.

The result is the MAC associated with any memory block that had not had data written recently would be out of synch with the epoch indicated by the global epoch counter. As long as the upper portion 104 of the global epoch counter 102 does not change, the value of the LSB 106 of the global epoch counter 102 can advance without the need for the value of the opportunity counter 110 to catch up. All of opportunity counters 110 of the memory blocks are compared to the value of the LSB 106 at step 319 except for the one that was just updated at step 313 which is skipped by the decision function performed in step 315. If the opportunity counter for block j is equal to the LSB of the epoch counter at step 319, then the opportunity counter has fallen behind by a number of epochs represented by the number of bits in the opportunity counter (in this example, four epochs, because the opportunity counter is 2 bits), and the MAC of memory block j needs to be refreshed at step 321.

Every cache line associated with an opportunity counter 110 matching the LSBs 106 of the new value of the global epoch counter 102, needs to immediately have its MAC recomputed. As part of the process of recomputing the MAC, the data within the cache line must first be authenticated. Authentication is performed by computing the MAC for the data in that cache line and comparing it to the stored MAC. The global sequence number previously used to compute the MAC was generated from a value that is 4 less than the current value of the global epoch counter 102 (for a global epoch in which the LSB is 2 bits). This is equivalent to reducing the value of the MSB s 104 of the global epoch counter 102 by 1. In the general case, the value to be used to compute the MAC is the value of the global epoch counter 102 minus the maximum value of the LSBs of the counter 102, plus one. Accordingly, in the above example in which there are two bits in the LSBs 106, the maximum value is the binary value 11=3. 3+1=4. In the case in which there are 6 bits in the LSBs 106, the maximum value is the binary value 111111=63. 63+1=64. This is also equal to $2n$, where n is the number of bits in the LSBs 106.

This is necessary because the only way the value of the LSB 106 of the global epoch 102 can be equal to the value of the opportunity counter 110 of a non-selected local sequence number 101, 103, 105, 107, is if the global epoch 102 has been incremented 4 times before the cache line associated with the non-selected local sequence number has been written out to external memory. In that case, the LSB 106 of the global epoch 102 will carry into the next bit of the global epoch counter 104. Therefore, the combination of the value of the global epoch counter 104 and the local sequence number 101, 103, 105, 107 will no longer be equal to the value that was previously used to generate the MAC for that cache line. Accordingly, reducing the value of the global epoch counter 102 allows the previous value to be recovered and used to authenticate the data. The new value can then be used to recompute and store a new MAC value for that memory block.

The opportunity counter 110 allows the MAC to be updated opportunistically offline or refreshed when the epoch counter changes (i.e., when the age counter rolls over). A background process or thread may update the local sequence numbers 101, 103, 105, 107 so that the opportunity counters 110 are in sync with the LSB 106 of the current epoch 102. This can occur when the cache is not busy, i.e., on a low priority process. Whenever a MAC refresh operation is performed, the age counter 115 resets to zero, to minimize the need for epoch updates. When a line is to be written back into memory, and the opportunity counter 110 does not match the LSB 106 of the current epoch 102, the opportunity counter 110 is then made equal to the value of the LSB 106 prior to computing the MAC. The age counter 115 is then also reset to zero. The MAC corresponding to the line is therefore refreshed opportunistically. This can occur while other operations are occurring, such as writes to other memory blocks 201.

If the opportunity counter for block j is not equal to the LSB of the epoch counter at step 319, then no update is necessary for block j, and the next block is checked by incrementing the value of j at step 317. Once the value of each of the opportunity counters 110 has been check in step 317 (i.e., the terminal value is reached), the process ends.

The above embodiment can also be used for encrypted memory systems.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine-readable instructions may alternatively be used. For example, the order of execution of the blocks may be changed, and/or some of the blocks described may be changed, eliminated, or combined.

It should be noted that the algorithms illustrated and discussed herein as having various modules that perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A data storage system with integrity protection comprising:
  a) a memory block;
  b) an age counter having a value and associated with the memory block; and
  c) an opportunity counter having a value and associated with the memory block, the opportunity counter incrementing by one when the age counter rolls over;
  d) an epoch counter comprising a field of most significant bits (MSBs) and a field of least significant bits (LSBs), the MSBs incrementing by one when the LSBs roll over;
  e) a cryptographic integrity protection code register; and
  f) a processor coupled to the memory block, age counter, opportunity counter and epoch counter, the processor:
    i. writing data to the memory block;
    ii. comparing the value of the opportunity counter to the LSBs of the epoch counter;
    iii. if the value of the opportunity counter is not equal to the value of the LSB of the epoch counter, then setting the value of the opportunity counter equal to the value of the LSBs of the epoch counter, setting the age counter to zero and generating a cryptographic integrity protection code based on the content of the memory block, the value of the age counter, the value of the opportunity counter and the value of the MSB of the epoch counter and storing the cryptographic integrity protection code in the cryptographic integrity protection code register;

iv. if the value of the opportunity counter is equal to the value of the LSB of the epoch counter, then incrementing the age counter;

v. incrementing the age counter;

vi. if the age counter does not roll over, then generating a cryptographic integrity protection code based on the content of the memory block, the value of the age counter, the value of the opportunity counter and the value of the MSB of the epoch counter and storing the cryptographic integrity protection code in the cryptographic integrity protection code register;

vii. if the age counter does roll over, then incrementing the epoch counter, setting the age counter to zero, generating a cryptographic integrity protection code based on the content of the memory block, the value of the age counter, the value of the opportunity counter and the value of the MSB of the epoch counter and storing the cryptographic integrity protection code in the cryptographic integrity protection code register;

viii. if the age counter does not roll over, then generating a cryptographic integrity protection code based on the content of the memory block, the value of the age counter, the value of the opportunity counter and the value of the MSB of the epoch counter and storing the cryptographic integrity protection code in the cryptographic integrity protection code register; and ix. if the value of the opportunity counter is not equal to the value of the LSB of the epoch counter, then setting the value of the opportunity counter equal to the value of the LSBs of the epoch counter, setting the age counter to zero and generating a cryptographic integrity protection code based on the content of the memory block, the value of the age counter, the value of the opportunity counter and the value of the MSB of the epoch counter and storing the cryptographic integrity protection code in the cryptographic integrity protection code register.

2. The data storage system of claim 1, further comprising a plurality of memory blocks, age counters, and opportunity counters, there being a one to one correspondence, such that for each memory block, there is one associated opportunity counter and one associated age counter.

3. The data storage system of claim 2, wherein;

a) if the age counter rolled over, after incrementing the epoch counter, comparing the value of the LSB of the epoch counter to the value of the opportunity counter associated with each of the memory blocks to which the processor did not write data;

b) if the value of the LSB of the epoch counter is equal to the value of the opportunity counter associated with a particular one of the memory blocks, then:

i. authenticating the contents of the memory block with a cryptographic integrity protection code generated from:

1. the contents of the particular one of the memory blocks;

2. value of the epoch counter minus the maximum value of the LSBs of the epoch counter plus one; and 3. the value of the age counter associated with the particular one of the memory blocks;

ii. setting the value of the opportunity counter associated with the particular memory block to the value of the LSBs of the epoch counter;

iii. setting the age counter associated with the particular memory block to zero; and iv. generating a new cryptographic integrity protection code from:

1. the contents of the particular one of the memory blocks;

2. value of the epoch counter; and 3. the value of the age counter associated with the particular one of the memory blocks.

4. The data storage system of claim 1, wherein the cryptographic integrity protection code is a message authentication code (MAC).

5. The data storage system of claim 1, wherein the values of the epoch counter, the opportunity counter and the age counter are all set to zero upon key initialization.

6. The data storage system of claim 1, wherein the cryptographic protection code is stored in the memory block.

* * * * *